United States Patent
Sha et al.

(10) Patent No.: US 12,340,708 B2
(45) Date of Patent: Jun. 24, 2025

(54) HAPTIC FEEDBACK FOR INFLUENCING USER ENGAGEMENT LEVEL WITH REMOTE EDUCATIONAL CONTENT

(71) Applicant: Dell Products L.P., Round Rock, TX (US)

(72) Inventors: Danqing Sha, Shanghai (CN); Eric Bruno, Shirley, NY (US); Amy Seibel, Newton, MA (US); Zhen Jia, Pudong (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/566,194

(22) Filed: Dec. 30, 2021

(65) Prior Publication Data

US 2023/0215288 A1   Jul. 6, 2023

(51) Int. Cl.
| | |
|---|---|
| *G09B 19/00* | (2006.01) |
| *G06F 3/01* | (2006.01) |
| *G09B 5/08* | (2006.01) |

(52) U.S. Cl.
CPC ............. *G09B 19/00* (2013.01); *G06F 3/016* (2013.01); *G09B 5/08* (2013.01)

(58) Field of Classification Search
CPC .................................. G09B 19/00; G09B 5/08
See application file for complete search history.

(56) References Cited

U.S. PATENT DOCUMENTS

| | | | | |
|---|---|---|---|---|
| 11,238,708 | B1* | 2/2022 | Kurien | G06Q 10/0639 |
| 2003/0030544 | A1* | 2/2003 | Smith | G09B 21/00 |
| | | | | 340/407.1 |
| 2008/0275358 | A1* | 11/2008 | Freer | G09B 7/02 |
| | | | | 434/236 |
| 2014/0324749 | A1* | 10/2014 | Peters | G09B 7/04 |
| | | | | 706/46 |

(Continued)

OTHER PUBLICATIONS

Xu, Tammy, "Haptic Technology Has More Applications Than You Think", https://builtin.com/artificial-intelligence/haptic-technology; updated Oct. 22, 2021, downloaded on Dec. 28, 2021.

(Continued)

*Primary Examiner* — Robert J Utama
*Assistant Examiner* — Correll T French
(74) *Attorney, Agent, or Firm* — Ryan, Mason & Lewis, LLP

(57) ABSTRACT

Techniques are provided that employ haptic feedback to influence an engagement level of a remote user. One method comprises obtaining sensor data associated with a remote user interacting with educational content items; applying the sensor data to an analytics engine to obtain an engagement status indicating an engagement level of the remote user with the educational content items; and automatically initiating a provision of a haptic feedback signal to the remote user based on the engagement status. The engagement status may comprise an engagement score, and the haptic feedback signal may be sent to the remote user based on an evaluation of the engagement score relative to one or more threshold- (Continued)

based criteria. A type and/or an intensity of the haptic feedback signal can be based on one or more user preferences of the remote user.

20 Claims, 7 Drawing Sheets

(56) References Cited

U.S. PATENT DOCUMENTS

| | | | | |
|---|---|---|---|---|
| 2016/0035230 | A1* | 2/2016 | Spaulding | H04L 67/535 |
| | | | | 434/236 |
| 2017/0148353 | A1* | 5/2017 | Hewitt | G09B 21/003 |
| 2017/0169715 | A1 | 6/2017 | Civitci et al. | |
| 2017/0193847 | A1* | 7/2017 | Ventrice | G09B 5/02 |
| 2020/0257364 | A1* | 8/2020 | Strandberg | B60K 35/00 |
| 2022/0269335 | A1* | 8/2022 | Perez-Rua | G10L 25/63 |

OTHER PUBLICATIONS

Barfield, Woodrow, "The Use of Haptic Display Technology in Education", https://files.eric.ed.gov/fulltext/EJ1131321.pdf, Themes in Science and Technology Education, pp. 11-30, downloaded on Dec. 28, 2021.

Magana, Alejandra, "Visuohaptic Experiments: Exploring the Effects of Visual and Haptic Feedback on Students' earning of Friction Concepts", https://onlinelibrary.wiley.com/doi/10.1002/cae.22157, downloaded on Dec. 28, 2021.

Webb et al., "Haptic-enabled collaborative learning in virtual realty for schools", https://link.springer.com/article/10.1007/s10639-021-10639-4, Published online Jul. 2, 2021, downloaded on Dec. 28, 2021.

\* cited by examiner

HAPTIC FEEDBACK FOR INFLUENCING USER ENGAGEMENT LEVEL WITH REMOTE EDUCATIONAL CONTENT

FIELD

The field relates generally to information processing systems and more particularly, to user monitoring techniques in such information processing systems.

BACKGROUND

Educational content is increasingly offered remotely for both academic students and professional learners. Remote educational content may comprise, for example, slide-based online activities, content presented as part of a video conference, and online courses. There are a number of challenges, however, that need to be addressed in order for a remote learner to achieve academic success. The consistent engagement of a student with the educational content, for example, is often harder to achieve in remote learning environments.

A need exists for improved techniques for increasing the engagement of remote learners.

SUMMARY

In one embodiment, a method comprises obtaining sensor data associated with at least one remote user interacting with one or more educational content items; applying the sensor data to at least one analytics engine to obtain an engagement status indicating an engagement level of the at least one remote user with the one or more educational content items; and automatically initiating a provision of at least one haptic feedback signal to the at least one remote user based at least in part on the engagement status.

In some embodiments, the engagement status may comprise an engagement score, and the automatically initiating the provision of the at least one haptic feedback signal to the at least one remote user may be performed based on an evaluation of the engagement score relative to one or more threshold-based criteria.

Feedback indicating whether the engagement status of the at least one remote user generated by the analytics engine is accurate may be used to update the analytics engine. In at least some embodiments, a type and/or an intensity of the at least one haptic feedback signal provided to the at least one remote user can be based on one or more specified user preferences of the at least one remote user.

Other illustrative embodiments include, without limitation, apparatus, systems, methods and computer program products comprising processor-readable storage media.

DETAILED DESCRIPTION

Figure 1:
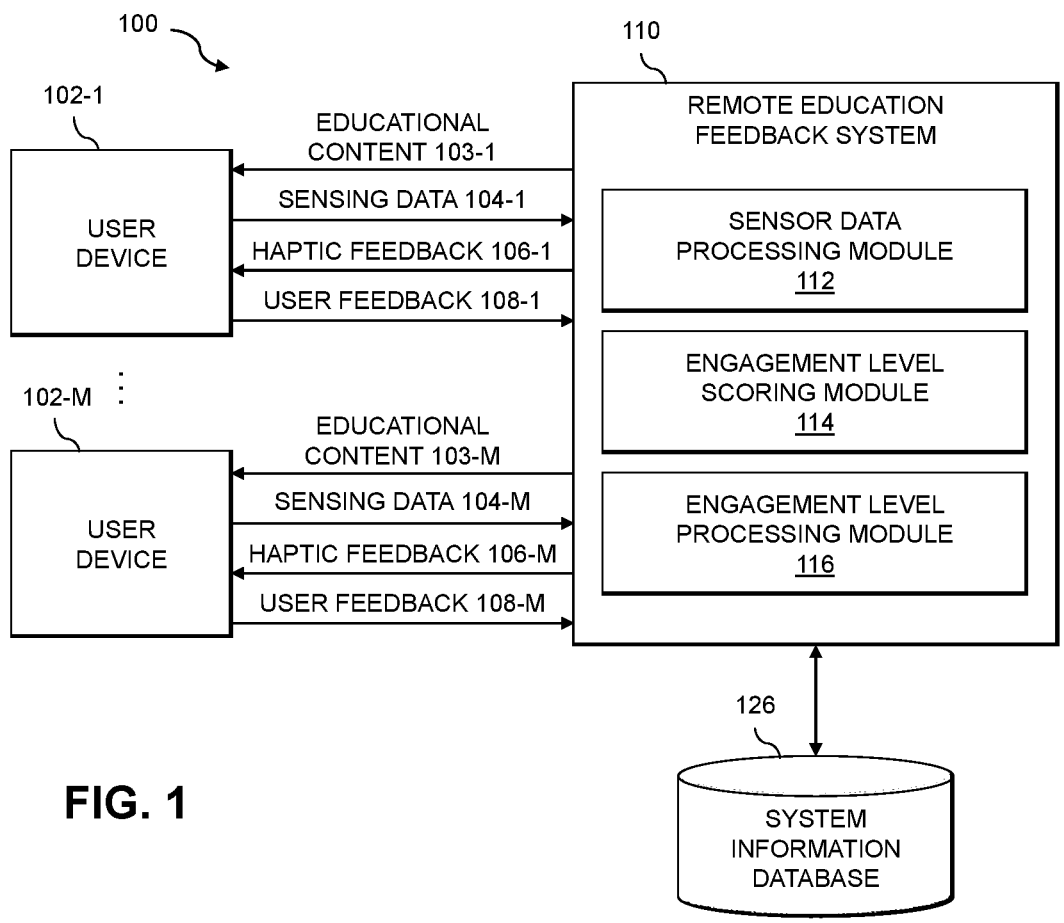
FIG. 1 illustrates an information processing system configured for providing haptic feedback to influence an engagement level of a user for remote education in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for providing haptic feedback to influence an engagement level of a user for remote education.

In one or more embodiments, techniques are provided to employ haptic feedback for remote education. Sensing data (such as Internet of Things (IoT) sensor data) related to one or more remote students or other users can be applied to the disclosed remote education feedback system (comprising, for example, one or more analytics algorithms, such as machine learning (ML) algorithms, computer vision (CV) algorithms and/or data analytics algorithms) to obtain a real-time measurement of an engagement level for each remote user. An engagement level of each remote user comprises the level of attention and/or interaction between a remote user and the presented educational content.

The measured engagement level of each user can be used to initiate a haptic feedback signal to those users having a low engagement level (e.g., below a specified threshold or relative to an engagement level of a group of peers or for the current learning scenario), as discussed further below, and/or to provide a visualization of the user engagement level to teachers or other administrative users. The haptic feedback can be sent automatically by the disclosed remote education feedback system or manually by the teacher or another user (for example, to the mouse, monitor, laptop, or another device of a user) as a warning signal or an alert. In at least some embodiments, a given user may opt-in for the haptic feedback, subject to any applicable privacy policies, rules or agreements.

The disclosed haptic feedback-based remote learning techniques enable a more intelligent management of students and an increased engagement level of the learning experience. In at least some embodiments, the disclosed haptic feedback techniques for remote education provide a number of technical solutions. For example, an engagement level of a particular student can be measured over time by applying sensing data related to the particular student to an analytics engine, and a haptic feedback warning signal or alert can be automatically provided to the student to improve an effectiveness of the learning experience when the measured engagement level falls below a specified threshold or otherwise deviates from one or more specified engagement level criteria. In addition, the haptic feedback signal can be used to improve the interaction between teachers and remote students.

In at least some embodiments, the disclosed remote education feedback system provides a technical solution that assists teachers with access to a measurement of an engagement level of each student in real time and allows teachers (or the automated system) to promptly take action (for example, in response to the measured engagement level of a student indicating that the student has become distracted).

In addition, the technical solutions provided by the disclosed remote education feedback system can improve learning outcomes for a diverse group of students and improve learning opportunities and outcomes. For example, the haptic feedback signal enabled by the disclosed techniques can help students with a disability, such as hearing or visual challenges, to receive feedback and reinforcement from the teacher. In one or more embodiments, the haptic feedback may be delivered to a particular user using a haptic feedback form that is tailored to the needs of the particular user.

One or more aspects of the disclosure recognize that some students with learning, behavioral, and/or other differences may appear to not be paying attention when they really are, or may appear to be flustered when they are not. More attention may be needed to ensure that these students continue to get the support and adaptive learning assistance that they need, and that machine learning models are designed to accommodate them. For example, in at least some embodiments, a machine learning model is trained with sufficient training data from students having learning, behavioral and/or other differences or disabilities to ensure that these students are receiving fair outcomes from the employed machine learning models.

In this manner, one or more embodiments of the disclosure provide technical solutions that take disabilities and/or other user differences into account in a haptic feedback plan tailored to each student, and enable a particular student or another trusted user to review and provide feedback on the haptic feedback plan of the particular user (and modify the haptic feedback plan, if necessary). For example, some students may opt to self-identify with a certain disability, or to select haptic feedback features that they would not be comfortable with (or that they prefer), and the haptic feedback plan would take this information into account when deciding which types of feedback are appropriate for a certain student.

In one or more embodiments, the disclosed techniques for providing haptic feedback for remote education employ computer vision techniques to allow learning platforms to collect and evaluate real-time learner behavior information, such as eye movement, body position (e.g., slouching or sitting up), and facial expression (e.g., yawning, frowning, or squinting eyes). The collected data can be processed to obtain an engagement level of one or more students and to initiate immediate intervention and/or reflective actions.

At least some aspects of the disclosure recognize that students tend to be less engaged in remote learning environments than in conventional learning environments because interactions between learners and teachers are reduced due to distance. The lack of physical proximity between instructors and learners decreases the rich communication and other dynamics that encourage students to participate consistently and efficiently in conventional learning environments.

In a physical learning environment, teachers can more easily identify when a student is bored, stressed, or distracted, for example, by evaluating the body language and facial expression of students to obtain an immediate assessment of each student's status. In a remote learning environment, however, it is difficult for teachers to evaluate and assess the students' engagement level remotely. With existing online learning techniques, where teachers must manually assess students using a camera view of each student, it is not easy for teachers to assess the status of each student effectively while also teaching the students.

FIG. 1 shows an information processing system 100 configured in accordance with an illustrative embodiment. The information processing system 100 comprises a plurality of user devices 102-1 through 102-M, collectively referred to herein as user devices 102. The information processing system 100 further comprises one or more remote education feedback systems 110 and a system information database 126, discussed below.

The user devices 102 may comprise, for example, host devices and/or devices such as mobile telephones, laptop computers, tablet computers, desktop computers or other types of computing devices (e.g., virtual reality (VR) devices or augmented reality (AR) devices). Such devices are examples of what are more generally referred to herein as "processing devices." Some of these processing devices are also generally referred to herein as "computers." The user devices 102 may comprise a network client that includes networking capabilities such as ethernet, Wi-Fi, etc. The user devices 102 may be implemented, for example, by students and/or educators.

One or more of the user devices 102 and the remote education feedback system 110 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of edge devices, or a stand-alone computing and storage system implemented within a given enterprise.

One or more of the user devices 102 and the remote education feedback system 110 illustratively comprise processing devices of one or more processing platforms. For example, the remote education feedback system 110 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the user devices 102 and the remote education feedback system 110 can additionally or alternatively be part of cloud infrastructure such as an Amazon Web Services (AWS) system. Other examples of cloud-based systems that can be used to provide at least portions of the user devices 102 and/or the remote education feedback system 110 include Google Cloud Platform (GCP) and Microsoft Azure.

In the example of FIG. 1, each user device 102-1 through 102-M receives educational content 103-1 through 103-M, collectively referred to herein as educational content 103, from the remote education feedback system 110 for the respective user. In addition, each user device 102-1 through 102-M provides corresponding sensing data 104-1 through 104-M, collectively referred to herein as sensing data 104, associated with the respective user. For example, the sensing data 104 may be generated by IoT sensors near students that can be used for data collection, including physiological data, motion and emotion. The sensors could be embedded with existing user devices 102, such as graspable and touchable user devices (e.g., computer, monitor, mouse, keyboards, smart phone and/or AR/VR headsets). The sensors may also be implemented as part of laptop computer devices, smart mobile devices or wearable devices on the body of a user, such as cameras, physiological sensors and smart watches. The haptic feedback 106 can be indicated, for example, using a ratings system, and can be initiated if the student is detected to have a different level of engagement than usual.

In addition, each user device 102-1 through 102-M can receive haptic feedback 106-1 through 106-M, collectively referred to herein as haptic feedback 106, from the remote education feedback system 110. For example, each user device 102 can receive haptic feedback from the remote education feedback system 110 based at least in part on the engagement level of the respective user with the educational content.

Further, each user device 102 can provide user feedback 108-1 through 108-M, collectively referred to herein as user feedback 108, to the remote education feedback system 110 indicating, for example, an accuracy of the measured engagement level of the respective user (e.g., to fine tune an analytics engine associated with the remote education feedback system 110), special circumstances associated with the respective user and/or haptic feedback preferences of the respective user.

In some embodiments, students can receive or request their measured engagement level from the remote education feedback system 110, and provide the user feedback 108 back to the remote education feedback system 110 indicating whether the measured engagement levels are accurate, thereby providing a closed loop learning system. The user feedback 108 indicating the accuracy of the measured engagement levels can be used to train and/or retrain one or more models employed by the analytics engine, as discussed further below in conjunction with FIG. 2.

In addition, as noted above, each user device 102 can employ the user feedback 108 to share information about a disability, age, or gender of the respective user so that the remote education feedback system 110 can ensure that users are not being unfairly targeted for any warnings, and that appropriate and helpful haptic feedback is provided to the users in order to provide a good and fair user experience. The user may selectively opt-in or opt-out of the sharing of such information, and any shared information may be subject to any applicable privacy policies, rules or agreements. User feedback 108 from a minimum number and/or percentage of students with each type of flag, or each behavior pattern, may be required in the training data.

As used herein, the term "haptic feedback" shall comprise any feedback signal that engages a sense of touch of a user and/or creates an experience of touch for the user, for example, by applying forces, pressure, vibrations, or motion to one or more of the user devices 102 (including electrotactile feedback and/or thermal feedback). It is noted that appropriate controls may be employed in some embodiments to ensure that the haptic feedback is not uncomfortable for the user. The haptic feedback 106 can be automatically provided as a warning or alert to a distracted student, for example. Haptics can also be used as a mechanism for providing feedback about the actions and/or tasks of a student, or can be combined with an education course to make the learning experience more vivid. The patterns of haptic feedback could be customized, for example, based on different scenarios or use cases.

In some embodiments, each user device 102 can receive additional feedback from the remote education feedback system 110 based at least in part on the engagement level of the respective user with the educational content. For example, in addition to a haptic feedback signal, the user may also receive a voice signal, a noise signal and/or virtual characters in an AR/VR device, or a combination of the foregoing could be used with the haptic feedback to provide an alert and/or warning to a particular user during a remote learning session. The virtual characters can act as an observer to the engagement level monitoring (e.g., the virtual characters could be hidden while the user is engaged, and can be activated to appear when a warning is needed).

The haptic feedback 106 can be automatically generated (optionally with voice messages, noise, virtual characters in AR/VR devices and/or other feedback) if students are detected to be distracted (e.g., when the measured engagement level falls below a threshold or deviates from another criteria). For example, a voice message can ask if a student needs assistance during remote learning, when the engagement level of the user falls below a threshold or indicates that the user is stressed. The patterns of haptic feedback could be specifically designed based on different scenarios.

In addition, a teacher can manually make a selection regarding students, and select the type of feedback to send. For example, the teacher can click a button next to an image of the student to manually initiate haptic feedback 106 (and/or a preassigned voice message) to a particular user. The haptic feedback 106 can be generated, for example, using vibrators or sound generators available within the user device 102 of a given user. In a further variation, the haptic feedback 106 can be generated, for example, using an independent haptic wearable device (e.g., a wrist band or a haptic vest).

The user devices 102 may incorporate one or more of the following haptic technologies to deliver the haptic feedback 106 to the respective user:

vibrotactile haptics (e.g., tiny motors that create vibrations and other tactile effects in mobile phones, game controllers and VR controllers);

ultrasonic mid-air haptics (where algorithms control ultrasound waves so that the combined pressure of the waves interacting produces a force that can be felt on the hands of a user; the "virtual touch" haptic technology means that the user does not need to be in contact with a physical surface);

microfluidics (where air or liquid is pushed into tiny chambers within a smart textile or other device, creating pockets of pressure or temperature on a user's skin);

force control (where levers or other large-scale mechanical devices are used to exert force on, for example, the hands, limbs or full body of a user); and surface haptics (that modulate friction between a user's finger and a touchscreen to create tactile effects).

In one or more embodiments, the haptic feedback 106 may employ different types of haptic patterns, for example, with customized sharpness and intensity. A wide range of different haptic experiences may be achieved by combining transient and continuous haptic events, varying sharpness and intensity, and including optional audio content. The patterns of haptic feedback could be specifically designed based on different scenarios. For example, in remote learning, the following exemplary haptic feedback options can be employed:

notification haptics to provide feedback about the outcome of a task or action from a student (such as providing a vibration and/or a sound of applause to: (i) provide praise and/or encouragement to a student, (ii) ask if a student understands the material or needs help, and/or (iii) echo an opinion of the teacher).

warning haptics to indicate a warning of disengaged or inappropriate behaviors from students;

impact haptics to provide a physical metaphor that can be used to complement a visual experience (e.g., during a lesson to make the educational content more vivid); and engagement confirmation haptics that present a number of haptic pulses, for example, to the remote student and the remote student must reply with the number of received pulses as a confirmation that the remote student is paying attention to the presented content.

As shown in FIG. 1, the exemplary remote education feedback system 110 comprises a sensor data processing module 112, an engagement level scoring module 114 and an engagement level processing module 116, as discussed further below. In one or more embodiments, the sensor data processing module 112 may be used to collect sensor data (e.g., sensing data 104) and to optionally perform one or more (i) pre-processing tasks, (ii) face and body detection tasks and/or (iii) hand and/or head tracking tasks to prepare the sensor data for further processing by an analytics engine, as discussed further below in conjunction with FIG. 2. The engagement level scoring module 114 evaluates the collected sensor data and determines an engagement level of one or more remote users interacting with educational content. The exemplary engagement level processing module 116 evaluates the engagement level determined by the engagement level scoring module 114 and may initiate haptic feedback 106 to one or more of the user devices 102.

It is to be appreciated that this particular arrangement of modules 112, 114, 116 illustrated in the remote education feedback system 110 of the FIG. 1 embodiment is presented by way of example only, and alternative arrangements can be used in other embodiments. For example, the functionality associated with modules 112, 114, 116 in other embodiments can be combined into a single module, or separated across a larger number of modules. As another example, multiple distinct processors and/or memory elements can be used to implement different ones of modules 112, 114, 116 or portions thereof. At least portions of modules 112, 114, 116 may be implemented at least in part in the form of software that is stored in memory and executed by a processor.

The remote education feedback system 110 may further include one or more additional modules and other components typically found in conventional implementations of such devices, although such additional modules and other components are omitted from the figure for clarity and simplicity of illustration.

In the FIG. 1 embodiment, the remote education feedback system 110 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the remote education feedback system 110 to reside in different data centers. Numerous other distributed implementations of the components of the system 100 are possible.

As noted above, the remote education feedback system 110 can have an associated system information database 126 configured to information related to one or more of the user devices 102, such as options for applying haptic feedback and user preference information. Although the system information is stored in the example of FIG. 1 in a single system information database 126, in other embodiments, an additional or alternative instance of the system information database 126, or portions thereof, may be incorporated into the remote education feedback system 110 or other portions of the system 100.

The system information database 126 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and the remote education feedback system 110 can be one or more input/output devices (not shown), which illustratively comprise keyboards, displays or other types of input/output devices in any combination. Such input/output devices can be used, for example, to support one or more user interfaces to a user device 102, as well as to support communication between the remote education feedback system 110 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for providing haptic feedback for remote education is presented by way of illustrative example only, and in other embodiments additional or alternative elements may be used. Thus, another embodiment includes additional or alternative systems, devices and other network entities, as well as different arrangements of modules and other components.

Figure 2:
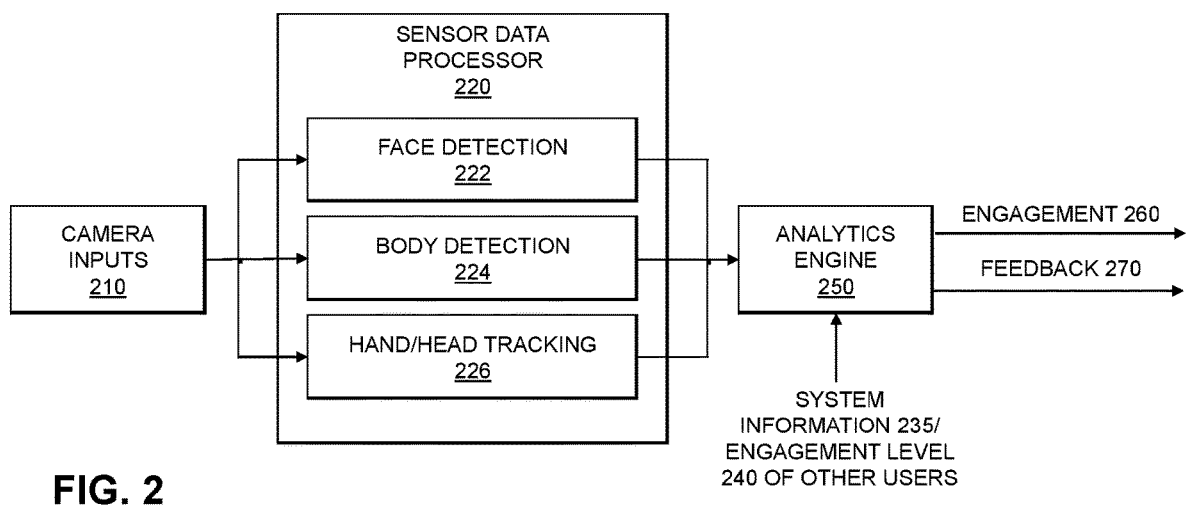
FIG. 2 illustrates a sensor data processor and an analytics engine for providing haptic feedback for remote education in accordance with an illustrative embodiment.

FIG. 2 illustrates a sensor data processor 220 and an analytics engine for providing haptic feedback for remote education according to one or more embodiments. In the example of FIG. 2, one or more camera inputs 210 obtained from at least one camera in the vicinity of a remote student are applied to the sensor data processor 220. The exemplary sensor data processor 220 comprises a face detection module 222, a body detection module 224 and a hand/head tracking module 226. In one or more embodiments, the face detection module 222 may be used to detect the face of the remote student in the obtained images, the body detection module 224 may be used to detect the body (and/or body position) of the remote student in the obtained images, and the hand/head tracking module 226 may be used to track the position and/or movement of the hand and/or head of the remote student.

It is to be appreciated that this particular arrangement of modules 222, 224, 226 illustrated in the sensor data processor 220 of the FIG. 2 embodiment is presented by way of example only, and alternative arrangements can be used in other embodiments. For example, the functionality associated with modules 222, 224, 226 in other embodiments can be combined into a single module, or separated across a larger number of modules. As another example, multiple distinct processors and/or memory elements can be used to implement different ones of modules 222, 224, 226 or portions thereof. At least portions of modules 222, 224, 226 may be implemented at least in part in the form of software that is stored in memory and executed by a processor.

The sensor data processor 220 may further include one or more additional modules and other components typically found in conventional implementations of such devices, although such additional modules and other components are omitted from the figure for clarity and simplicity of illustration.

The signals generated by the face detection module 222, the body detection module 224 and the hand/head tracking module 226 are applied to an analytics engine 250, along with optional system information 235 and/or an engagement level 240 of other users. The applied system information 235 may comprise, for example, a characterization of the participation of one or more remote students in class activities (e.g., number of logins, number of questions asked or answered, percentage of questions answered correctly, lectures/presentations completed, engaged time; a characterization of the interactions of one or more of the remote students with the presented content, or with the teacher; questions asked by the teaches (or answered by the students); articles that are posted on the bulletin board; times that the remote students participated in discussions; sensing data (e.g., face/gaze detection and/or motion (e.g., body, hand and/or head movements): and physiological data (such as heartrate, temperature and blood pressure).

In one or more embodiments, the analytics engine 250 analyzes the applied input signals to generate the measured engagement level 260 of a particular remote student and to generate haptic feedback 270 (optionally with insights and/or recommendations). The analytics engine 250 may compare the measured data of a particular remote student to (i) a baseline measurement for the student, (ii) typical students with similar profiles, and/or (iii) a larger group as a whole (e.g., using the engagement level 240 of other users). The students that are used as a reference group may comprise a sufficient number of students having different characteristics in order to take actions based on comparisons with larger groups of remote students.

The exemplary analytics engine 250 may employ one or more machine learning models (e.g., neural networks and/or federated learning models). The one or more machine learning models may comprise newly developed machine learning models and/or existing publicly available machine learning models that are based on a detailed use case. In some embodiments, the machine learning models may be trained on a dataset that is as unbiased as possible, for example, by ensuring that many different types of students are included in the training data. The training data may be labeled with a classification indicating the engagement level of the students in the training data. During the training phase, the machine learning model learns to output an engagement level and/or insights (e.g., real-time feedback, predictions about future performance and/or a customized haptic feedback plan/recommendation).

In one or more embodiments, the haptic feedback plan generated by the one or more machine learning models will indicate how to best engage each student. The engagement of each student may address, for example, a diversity and inclusion perspective, because students may have different baseline behaviors, and may exhibit behaviors or tendencies that are different from a typical student. For example, some students may naturally fidget a lot, or be afraid of sudden sounds. As a result, different students may require different haptic feedback approaches. The student, their guardian or one of their educators may overwrite or modify the generated haptic plan, which can help ensure fair plans for each student while enabling feedback to improve the machine learning model.

In one or more embodiments, the haptic feedback plan generated by the one or more machine learning models considers a diversity of students. Some students may have movement differences, for example, or may think best while pacing and/or fidgeting. The analytics engine 250 will establish a baseline for each student's behavior and then identify differences from the typical baseline behavior. Some students may need another person in the room for assistance or monitoring due to a disability, which can be addressed by applying a logged accommodation to the analytics engine 250 (or some other action to ensure that a particular student is not unfairly targeted by the haptic feedback).

The measurement during the training phase may measure an engagement level of one or more students in real time. The result is a feedback loop where the analytics engine 250 can be continuously improved to best measure the engagement level of a student. The students can provide user feedback 108 indicating whether their engagement levels are accurately portrayed. This could be done via ratings systems, for example, and could also be initiated if the student is detected to have a different level of engagement than usual for the current learning scenario.

Figure 3:
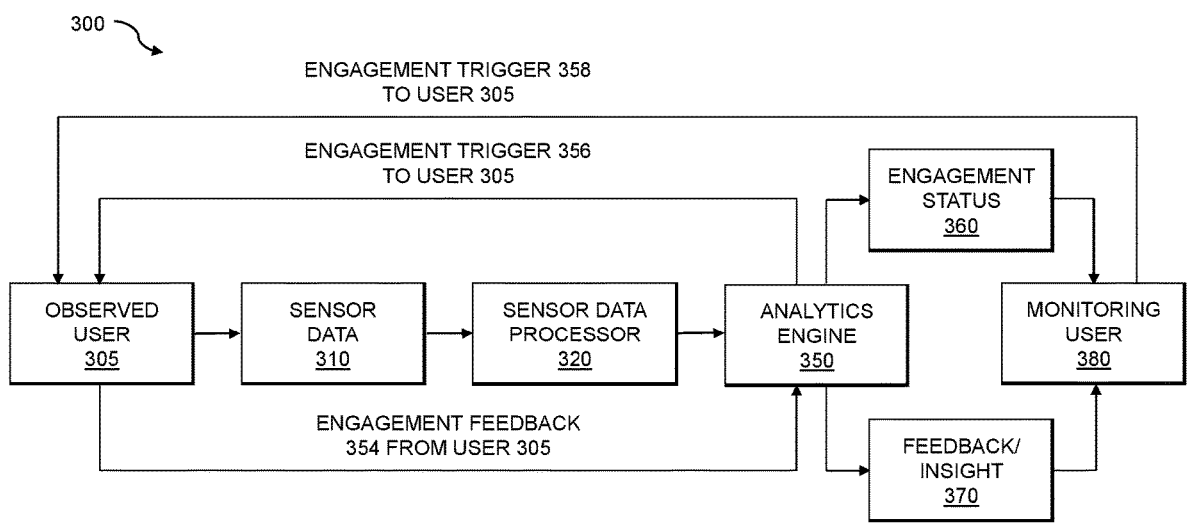
FIG. 3 illustrates an exemplary system architecture for providing haptic feedback for remote education in accordance with an illustrative embodiment.

FIG. 3 illustrates an exemplary system architecture 300 for providing haptic feedback for remote education, according to one embodiment of the disclosure. In the example of FIG. 3, sensor data 310 related to an observed user 305 is processed by a sensor data processor 320. The sensor data processor 320 may be implemented in a similar manner as the sensor data processor 220 of FIG. 2. The sensor data processor 320 generates one or more signals that are applied to an analytics engine 350. The analytics engine 350 may be implemented in a similar manner as the analytics engine 250 of FIG. 2.

The exemplary analytics engine 350 analyzes the applied input signals from the, as well as an engagement feedback signal 354 from the observed user 305 indicating whether the measured engagement level is accurate and/or whether the form of haptic feedback is suitable for this particular observed user 305. The exemplary analytics engine 350 may send an engagement trigger 356 to the particular observed user 305, for example, when the measured engagement level of the particular observed user 305 falls below a specified threshold, or otherwise deviates from a baseline behavior. As noted above, the generated engagement trigger 356 may take disabilities and/or other differences of the particular observed user 305 into account in a customized haptic feedback plan for the particular observed user 305. The feedback signal 354 from the observed user 305 provides a mechanism to allow the particular observed user 305 (or another trusted user, such as an administrator) to see and provide feedback on the haptic feedback plan (and modify it if necessary). For example, some students may opt to self-identify with a certain disability, or to select haptic feedback features that they would, or would not, be comfortable with, and the generated haptic feedback plan would take this into account when deciding which types of engagement trigger 356 are appropriate for a certain student.

The exemplary analytics engine 350 may also generate (i) a measured engagement status 360 of each particular observed user 305 that is provided to a monitoring user 380 (e.g., a teacher, a principal and/or another administrator); and/or (ii) feedback/insights 370 that is provided to the monitoring user 380, as discussed hereinafter.

In the example of FIG. 3, the monitoring user 380 (e.g., a teacher or an administrator) may manually initiate an engagement trigger 358 being sent to the particular observed user 305, for example, when the teacher observes or otherwise suspects that the particular observed user 305 is not currently engaged with the presented educational content. The engagement trigger 358 may be sent in accordance with the generated haptic feedback plan, in a similar manner as the engagement trigger 356.

A dashboard can be employed to indicate the measured engagement status 360 of each particular observed user 305. The teacher can thus have an immediate view and understanding of each student's engagement status during learning, and make adjustment of education contents/style, or sending warning/alerts accordingly. Thus, in some embodiments, the monitoring user 380 may manually initiate a haptic feedback signal to an observed user 305.

The feedback/insights 370 provided to a monitoring user 380 may be employed to better manage the participants. Based on the provided insights, teachers can improve the knowledge and skill acquisition of their students accordingly. For example, teachers can see what type of information (e.g., text, images, infographics, or videos) that students engage with most and use such types of information more frequently in subsequent lessons. Also, teachers can notice what pieces of knowledge were not effectively delivered based on the measured engagement level and enhance such pieces of knowledge for a future lesson. In some embodiments, such information identifying pieces of knowledge that were not effectively delivered can be applied to an automated teaching tool. For example, if the engagement levels of the participating students drop consistently in a particular lesson, it could indicate an issue with the learning material or teaching style in general.

In this manner, the measured engagement levels can be used as an indicator that some teaching material is ineffective and in need of improvement. Moreover, the measured engagement levels can help educators identify blocks of students who may have academic or behavioral challenges. Teachers can use such information to develop a way to help students reach their full potential. The teacher can also adjust the feedback/insights 370 if they are not correct, providing additional feedback to the analytics engine 350 (e.g., for retraining).

Figure 4:
FIG. 4 is a sample table illustrating a number of exemplary sensor types in accordance with an illustrative embodiment.

FIG. 4 is a sample table 400 illustrating a number of exemplary sensor types that may generate the sensor data 310 of FIG. 3, according to various embodiments. In the example of FIG. 4, presence sensors can be used to detect a presence of one or more users; position sensors can be used to detect a location of one or more users; physiological sensors can be used to collect real time data that reflect the real time physical status of students; cameras and/or motion sensors can be used to evaluate the hand, face, emotion and/or body of one or more users; a microphone can be used to evaluate a voice of one or more users; a camera signal can be used to perform gaze detection, eye tracking, emotion detection, facial recognition, and/or presence detection of one or more users; and a gyroscope sensor can be used to monitor the movement of the hands and/or head of one or more users. Computer vision algorithms can optionally enhance the ability of educators to detect, measure, and respond to student learning behaviors and engagement, which could be further used to provide tutors with relevant feedback.

Figure 5:
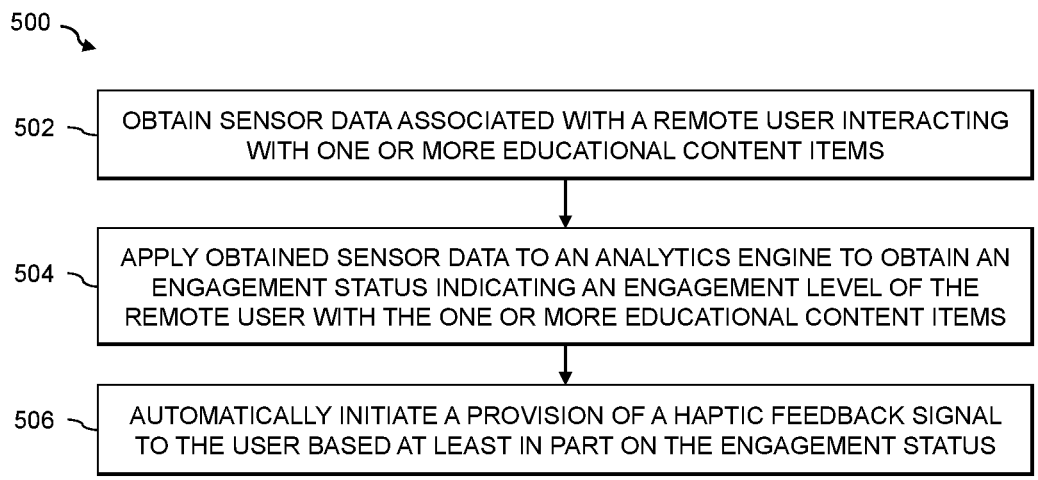
FIG. 5 is a flow diagram illustrating an exemplary implementation of a process for providing haptic feedback for remote education in accordance with an illustrative embodiment.

FIG. 5 is a flow diagram illustrating an exemplary implementation of a process 500 for providing haptic feedback for remote education, according to various embodiments. In the example of FIG. 5, the process 500 initially obtains sensor data in step 502 associated with at least one remote user interacting with one or more educational content items. In step 504, the process 500 applies the sensor data to at least one analytics engine to obtain an engagement status indicating an engagement level of the at least one remote user with the one or more educational content items.

A provision of at least one haptic feedback signal to the at least one remote user is automatically initiated in step 506 based at least in part on the engagement status. In some embodiments, an audio signal and/or a visual signal may also be sent to the at least one remote user with the at least one haptic feedback signal.

The engagement status may comprise an engagement score, and the automatically initiating the provision of the at least one haptic feedback signal to the at least one remote user may be performed based on an evaluation of the engagement score relative to one or more threshold-based criteria (e.g., falling below or exceeding a threshold value or range).

Feedback indicating whether the engagement status of the at least one remote user generated by the analytics engine is accurate may be used to update the analytics engine. In some embodiments, a type and/or an intensity of the at least one haptic feedback signal provided to the at least one remote user can be based on one or more specified user preferences of the at least one remote user.

The measured engagement level of the at least one remote user and one or more additional users may be used to update at least one of the educational content items.

The particular processing operations and other network functionality described in conjunction with the flow diagram of FIG. 5 are presented by way of illustrative example only, and should not be construed as limiting the scope of the disclosure in any way. Alternative embodiments can use other types of processing operations for providing haptic feedback for remote education. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for providing haptic feedback for influencing a user engagement level for remote education. The foregoing applications and associated embodiments should be considered as illustrative only, and numerous other embodiments can be configured using the techniques disclosed herein, in a wide variety of different applications.

It should also be understood that the disclosed techniques for providing haptic feedback for remote education, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for providing haptic feedback for influencing a user engagement level for remote education may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based remote learning engine that uses haptic feedback, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
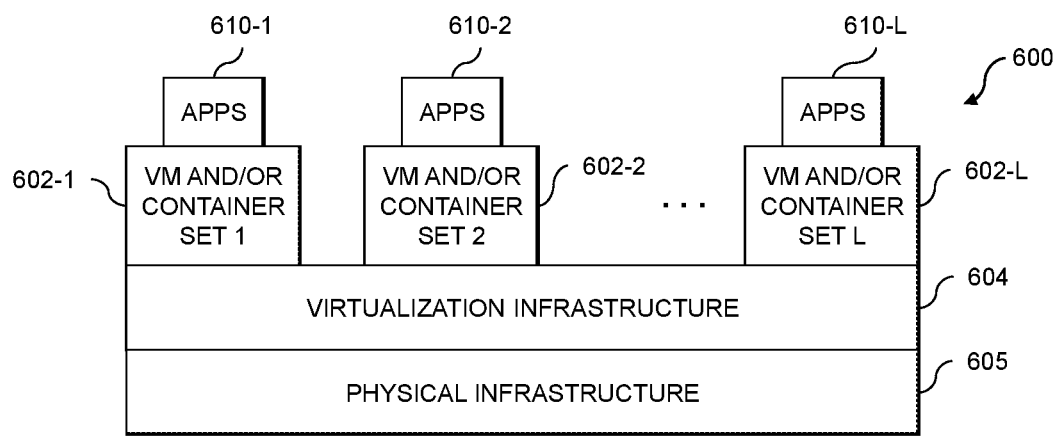
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide haptic feedback-based remote learning functionality of the type described above for one or more processes running on a given one of the VMs. For example, each of the VMs can implement haptic feedback-based remote learning control logic and associated functionality for initiating a haptic feedback signal, when needed, for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide haptic feedback-based remote learning functionality of the type described above for one or more processes running on different ones of the containers. For example, a container host device supporting multiple containers of one or more container sets can implement one or more instances of haptic feedback-based remote learning control logic and associated functionality for initiating a haptic feedback signal, when needed.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
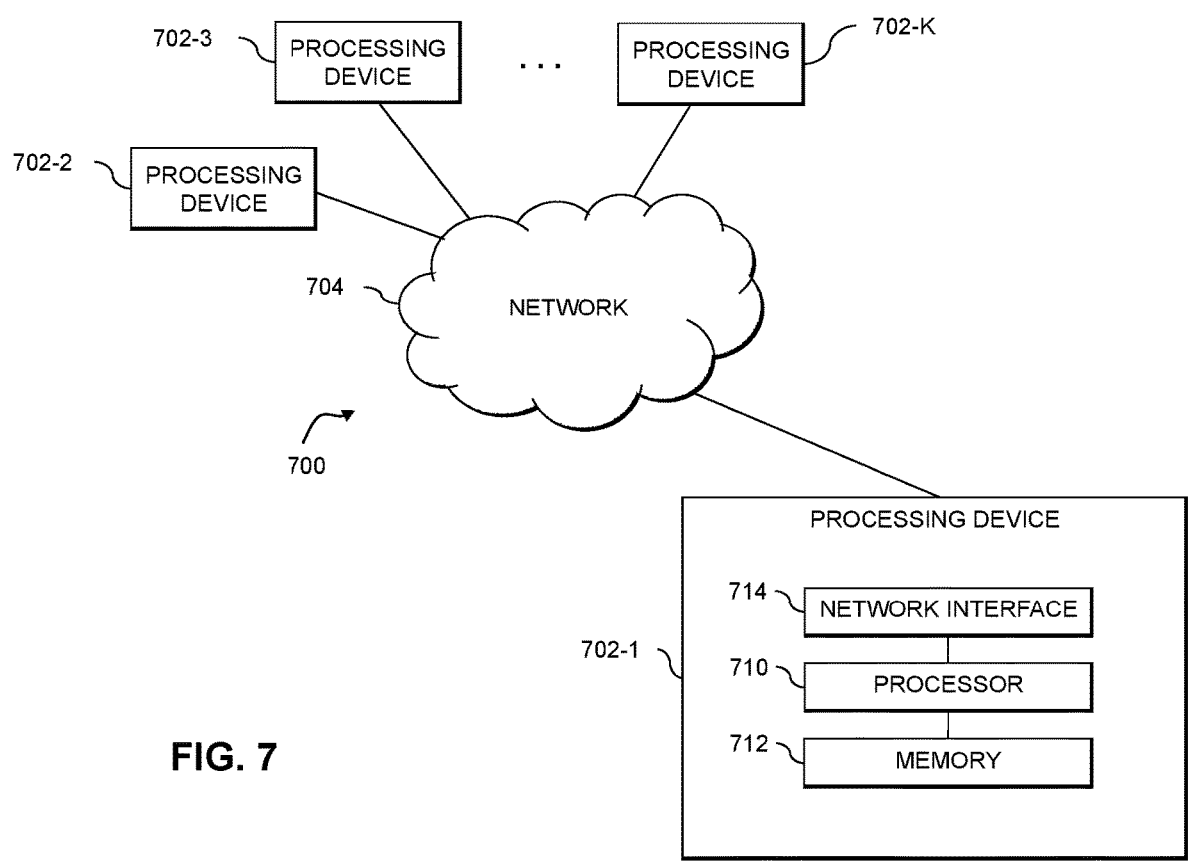
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining sensor data associated with a plurality of remote users interacting with one or more educational content items;
   applying the sensor data to at least one analytics engine to obtain an engagement status indicating a measured engagement level of the plurality of remote users interacting with the one or more educational content items, wherein the at least one analytics engine analyzes at least some of the applied sensor data to generate the measured engagement level of the plurality of remote users interacting with the one or more educational content items and compares (i) the measured engagement level of a first remote user of the plurality of remote users interacting with the one or more educational content items to (ii) the measured engagement level of one or more additional users of the plurality of remote users interacting with the one or more educational content items, wherein the generation of the measured engagement level of the plurality of remote users and the comparison of (i) the measured engagement level of the first remote user and (ii) the measured engagement level of the one or more additional users are performed substantially close in time to the plurality of remote users interacting with the one or more educational content items;
   automatically initiating a provision of at least one haptic feedback signal to the first remote user, based at least in part on the engagement status, to increase the engagement status of the first remote user, wherein the at least one haptic feedback signal is provided to the first remote user in accordance with a haptic feedback plan of the first remote user, wherein the haptic feedback plan of the first remote user is generated during a training phase using (i) one or more machine learning models of the at least one analytics engine that generate the haptic feedback plan to increase the engagement status of the first remote user interacting with the one or more educational content items and (ii) training data labeled with a classification indicating the engagement level of a plurality of the remote users interacting with one or more educational content items; and
   modifying at least one property, in the haptic feedback plan of the first remote user, of the at least one haptic feedback signal provided to the first remote user to increase the engagement status of the first remote user interacting with the one or more educational content items, wherein the modifying is based at least in part on feedback from one or more of the first remote user and a second user;
   wherein the method is performed by at least one processing device comprising a processor coupled to a memory.

2. The method of claim 1, wherein the automatically initiating the provision of the at least one haptic feedback signal to the first remote user further comprises initiating the provision of one or more of an audio signal and a visual signal to the first remote user.

3. The method of claim 1, wherein the engagement status comprises an engagement score and wherein the automatically initiating the provision of the at least one haptic feedback signal to the first remote user is performed based on an evaluation of the engagement score relative to one or more threshold-based criteria.

4. The method of claim 1, further comprising applying the measured engagement level of the one or more additional users to the at least one analytics engine.

5. The method of claim 1, further comprising employing feedback, from one or more of the first remote user and another user, indicating whether the engagement status of the first remote user generated by the at least one analytics engine is accurate, to update the at least one analytics engine.

6. The method of claim 1, wherein one or more of a type and an intensity of the at least one haptic feedback signal provided to the first remote user is based on one or more user preferences of the first remote user.

7. The method of claim 1, further comprising updating at least one of the one or more educational content items based at least in part on the measured engagement level of the first remote user and the one or more additional users.

8. An apparatus comprising:
   at least one processing device comprising a processor coupled to a memory;
   the at least one processing device being configured to implement the following steps:
   obtaining sensor data associated with a plurality of remote users interacting with one or more educational content items;
   applying the sensor data to at least one analytics engine to obtain an engagement status indicating a measured engagement level of the plurality of remote users interacting with the one or more educational content items, wherein the at least one analytics engine analyzes at least some of the applied sensor data to generate the measured engagement level of the plurality of remote users interacting with the one or more educational content items and compares (i) the measured engagement level of a first remote user of the plurality of remote users interacting with the one or more educational content items to (ii) the measured engagement level of one or more additional users of the plurality of remote users interacting with the one or more educational content items, wherein the generation of the measured engagement level of the plurality of remote users and the comparison of (i) the measured engagement level of the first remote user and (ii) the measured engagement level of the one or more additional users are performed substantially close in time to the plurality of remote users interacting with the one or more educational content items;
   automatically initiating a provision of at least one haptic feedback signal to the first remote user, based at least in part on the engagement status, to increase the engagement status of the first remote user, wherein the at least one haptic feedback signal is provided to the first remote user in accordance with a haptic feedback plan of the first remote user, wherein the haptic feedback plan of the first remote user is generated during a training phase using (i) one or more machine learning models of the at least one analytics engine that generate the haptic feedback plan to increase the engagement status of the first remote user interacting with the one or more educational content items and (ii) training data labeled with a classification indicating the measured engagement level of a plurality of the remote users interacting with the one or more educational content items; and
   modifying at least one property, in the haptic feedback plan of the first remote user, of the at least one haptic feedback signal provided to the first remote user to increase the engagement status of the first remote user interacting with the one or more educational content items, wherein the modifying is based at least in part on feedback from one or more of the first remote user and a second user.

9. The apparatus of claim 8, wherein the automatically initiating the provision of the at least one haptic feedback signal to the first remote user further comprises initiating the provision of one or more of an audio signal and a visual signal to the first remote user.

10. The apparatus of claim 8, wherein the engagement status comprises an engagement score and wherein the automatically initiating the provision of the at least one haptic feedback signal to the first remote user is performed based on an evaluation of the engagement score relative to one or more threshold-based criteria.

11. The apparatus of claim 8, further comprising employing feedback, from one or more of the first remote user and another user, indicating whether the engagement status of the first remote user generated by the at least one analytics engine is accurate, to update the at least one analytics engine.

12. A non-transitory processor-readable storage medium having stored therein program code of one or more software programs, wherein the program code when executed by at least one processing device causes the at least one processing device to perform the following steps:
obtaining sensor data associated with a plurality of remote users interacting with one or more educational content items;
applying the sensor data to at least one analytics engine to obtain an engagement status indicating a measured engagement level of the plurality of remote users interacting with the one or more educational content items, wherein the at least one analytics engine analyzes at least some of the applied sensor data to generate the measured engagement level of the plurality of remote users interacting with the one or more educational content items and compares (i) the measured engagement level of a first remote user of the plurality of remote users interacting with the one or more educational content items to (ii) the measured engagement level of one or more additional users of the plurality of remote users interacting with the one or more educational content items, wherein the generation of the measured engagement level of the plurality of remote users and the comparison of (i) the measured engagement level of the first remote user and (ii) the measured engagement level of the one or more additional users are performed substantially close in time to the plurality of remote users interacting with the one or more educational content items;
automatically initiating a provision of at least one haptic feedback signal to the first remote user, based at least in part on the engagement status, to increase the engagement status of the first remote user, wherein the at least one haptic feedback signal is provided to the first remote user in accordance with a haptic feedback plan of the first remote user, wherein the haptic feedback plan of the first remote user is generated during a training phase using (i) one or more machine learning models of the at least one analytics engine that generate the haptic feedback plan to increase the engagement status of the first remote user interacting with the one or more educational content items and (ii) training data labeled with a classification indicating the measured engagement level of a plurality of the remote users interacting with the one or more educational content items; and
modifying at least one property, in the haptic feedback plan of the first remote user, of the at least one haptic feedback signal provided to the first remote user to increase the engagement status of the first remote user interacting with the one or more educational content items, wherein the modifying is based at least in part on feedback from one or more of the first remote user and a second user.

13. The non-transitory processor-readable storage medium of claim 12, wherein the engagement status comprises an engagement score and wherein the automatically initiating the provision of the at least one haptic feedback signal to the first remote user is performed based on an evaluation of the engagement score relative to one or more threshold-based criteria.

14. The non-transitory processor-readable storage medium of claim 12, further comprising employing feedback, from one or more of the first remote user and another user, indicating whether the engagement status of the first remote user generated by the at least one analytics engine is accurate, to update the at least one analytics engine.

15. The non-transitory processor-readable storage medium of claim 12, wherein one or more of a type and an intensity of the at least one haptic feedback signal provided to the first remote user is based on one or more user preferences of the first remote user.

16. The non-transitory processor-readable storage medium of claim 12, further comprising updating at least one of the one or more educational content items based at least in part on the measured engagement level of the first remote user and the one or more additional users.

17. The method of claim 1, wherein the at least one analytics engine establishes a baseline behavior of the first remote user and identifies one or more differences in a behavior of the first remote user from the established baseline behavior of the first remote user.

18. The non-transitory processor-readable storage medium of claim 12, wherein the at least one analytics engine establishes a baseline behavior of the first remote user and identifies one or more differences in a behavior of the first remote user from the established baseline behavior of the first remote user.

19. The method of claim 1, wherein the at least one analytics engine is trained using training data from students having a plurality of disabilities.

20. The method of claim 1, wherein the feedback from the one or more of the first remote user and the second user is provided using a feedback path in connection with the first remote user interacting with the one or more educational content items.

* * * * *

UNITED STATES PATENT AND TRADEMARK OFFICE
CERTIFICATE OF CORRECTION

PATENT NO. : 12,340,708 B2
APPLICATION NO. : 17/566194
DATED : June 24, 2025
INVENTOR(S) : Danqing Sha et al.

Page 1 of 1

It is certified that error appears in the above-identified patent and that said Letters Patent is hereby corrected as shown below:

In the Claims

Column 17, Lines 43-45, in Claim 1, replace "labeled with a classification indicating the engagement level of a plurality of the remote users interacting with one or more educational content items; and" with -- labeled with a classification indicating the measured engagement level of a plurality of the remote users interacting with the one or more educational content items; and --

Signed and Sealed this
Twenty-second Day of July, 2025

Coke Morgan Stewart
*Acting Director of the United States Patent and Trademark Office*